2,940,984

TRICYCLO (4.2.1.0²,⁵) NON-7-ENES AND TETRACYCLO (3.2.1.1³,⁸.0²,⁴) NONANES

Douglas E. Applequist, Urbana, Ill., and David Charles England, Wilmington, Del., assignors to E. I. du Pont de Nemours and Company, Wilmington, Del., a corporation of Delaware No Drawing. Filed June 19, 1957, Ser. No. 666,758

2 Claims. (Cl. 260—346.3)

This invention relates to new polycyclic organic compounds. More particularly it relates to new compounds having bridged ring systems, which are derived from bicyclo(2.2.1)hepta-2,5-diene.

The novel products of the invention are the addition products of 1 mole of bicyclo(2.2.1)hepta-2,5-diene with 1 mole of a monoethylenic, $\alpha,\beta$-unsaturated carboxylic acid or a compound hydrolyzable thereto. The addition can proceed in one or both of two ways depending upon whether one or both double bonds of bicyclo(2.2.1)hepta-2,5-diene (hereinafter called bicycloheptadiene for the sake of brevity) are effected.

Thus, the adducts of this invention are more specifically defined as members of one of the following classes of polycyclic compounds wherein the method used for naming and numbering is that used by Chemical Abstracts and more fully explained in "The Ring Index," (A.C.S. Monograph 84, by Patterson and Capell) and in J. Am. Chem. Soc., 50, 3080–4 (1928). The carbon atoms are numbered for ease of reference.

I. The tricyclo(4.2.1.0²,⁵)non-7-enes having on at least one of the carbon atoms in the 3- and 4-positions at least one carboxy group or group hydrolyzable thereto. These compounds are represented by the structural formula

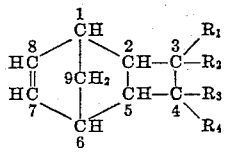

II. The tetracyclo(3.2.1.1³,⁸.0²,⁴)nonanes having on at least one of the carbon atoms in the 6- and 7-positions at least one carboxy group or group hydrolyzable thereto. These compounds are represented by the structural formula

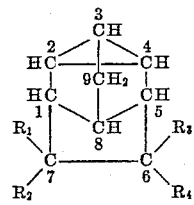

In each of the above formulas at least one of the R's is carboxy or a group hydrolyzable thereto. This terminology is intended to include the case where two R's form the anhydride group. The other R's are hydrogen atoms or hydrocarbon radicals free of non-aromatic unsaturation.

The reaction between bicycloheptadiene and the monoethylenic $\alpha,\beta$-unsaturated compound can be represented by the equation

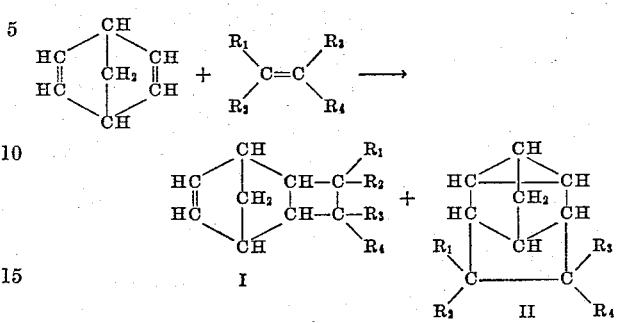

wherein the R's are defined as above. The equation shows addition can involve only one of the bicycloheptadiene double bonds, in which case a compound of type I is formed, or both double bonds, in which case a compound of type II is formed, this compound having an additional valence bridge to compensate for the opening of both double bonds. Depending upon the nature of the $\alpha,\beta$-unsaturate, either compound can predominate; in some cases, the compound of type II constitutes all or nearly all of the reaction product.

Bicycloheptadiene which comprises one reactant is a commercial product. It can be prepared from cyclopentadiene and acetylene as described for example in British Patent 701,211.

The reaction is general with $\alpha,\beta$-ethylenically unsaturated carboxylic acids or compounds hydrolyzable thereto, such as the $\alpha,\beta$-unsaturated esters, nitriles, and anhydrides. These materials are commercially available or can be prepared by known methods. They have the general formula

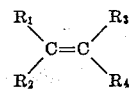

wherein at least one of the R's is a carboxy group or a group hydrolyzable to a carboxy group (including the case where $R_1$ and $R_3$ together form the anhydride group, —CO—O—CO—) and the others are hydrogen atoms or aliphatically saturated hydrocarbon radicals. Such groups as alkyl, cycloalkyl, aralkyl, alkaryl and aryl are suitable, with the preferred groups having from 1 to 6 carbon atoms.

The carboxy-precursor groups in these $\alpha,\beta$-unsaturates can be the hydrocarbyloxycarbonyl groups, —COOR, where R is an aliphatically saturated hydrocarbon radical of 1 to 6 carbon atoms; the cyano group, —CN; and the anhydride group, —CO—O—CO—.

The most useful and preferred $\alpha,\beta$-unsaturates are those which contain a total of 3 to 10 carbon atoms and in which any substituents other than the carboxy or carboxy-precursor group or groups, are hydrocarbon groups of 1 to 6 carbon atoms free of non-aromatic unsaturation.

It should be noted that any specific product of this invention need not necessarily be prepared by addition to bicycloheptadiene of the precisely corresponding $\alpha,\beta$-unsaturate, since the carboxy or carboxy-precursor groups in the initial adduct can be converted to other such groups by known chemical methods. For example, a polycyclic adduct containing a carboxy group can be converted to one containing an ester group, or vice versa, by known chemical treatments.

The process of the invention is carried out simply by maintaining the two reactants in contact at an elevated temperature which can be as low as 50° C. or even less with the more reactive unsaturates but is desirably above 100° C. and preferably in the range of 100–250° C. The relative proportions of the two reactants are important only from the standpoint of utilizing both as completely as possible. For this reason, they are preferably used in approximately equimolar proportions, or with a slight excess, e.g., 10–50%, of one or the other. A solvent or diluent is in general unnecessary, but if desired, any suitable inert solvent can be used, e.g., an aromatic hydrocarbon such as benzene, toluene or the xylenes, or an ether such as dioxane or tetrahydrofuran.

If desired, the reaction can be carried out in the presence of catalytic amounts of a nickel carbonyl/phosphite complex of the general formula $[(RO)_3P]_2Ni(CO)_2$, where R is a hydrocarbon radical free from aliphatic unsaturation, e.g., an alkyl, aryl, aralkyl or cycloalkyl radical, usually of not more than seven carbon atoms. It has been found that with the use of a catalyst of this type, the reaction proceeds at lower temperatures than in their absence. The nickel carbonyl/phosphite complexes have been described in the literature (Reed, J. Chem. Soc. 1954, 1940). Illustrative members of this class suitable for use in the process of this invention are bi(triphenyl phosphite)nickel dicarbonyl, bis(tritolyl phospite)nickel dicarbonyl, bis(trimethylphosphite)nickel dicarbonyl, bis(tribenzyl phosphite)nickel dicarbonyl, bis(tricyclohexyl phosphite)nickel dicarbonyl, and the like. The bis(triaryl phosphite)nickel dicarbonyls are in general preferred, particularly those in which the aryl radical has not more than seven carbon atoms. The catalyst need be used only in very small amounts, e.g., in amounts such that there is present from about 0.001 to about 0.05 gram atom of nickel per mole of bicycloheptadiene. Higher amounts can be used but it is unnecessary to do so. The use of such a catalyst is illustrated in some of the examples which follow.

The reaction is conveniently carried out in a closed pressure vessel at the autogenous pressure developed by the reactants, or in an open vessel under reflux with the more reactive unsaturates or when using a nickel carbonyl/phosphite complex as catalyst. Substantial or nearly complete conversions are in general obtained within one to twelve hours at the preferred reaction temperature. Preferably, though not necessarily, a small amount of a polymerization inhibitor such as phenothiazine, hydroquinone, resorcinol, and the like, is added to the reaction mixture to prevent or minimize the polymerization of the α,β-unsaturated ethylenic compound. The polymerization inhibitor is suitably used in amounts between 0.1 and 5% by weight of the α,β-unsaturated reactant.

The reaction products are distillable liquids or crystalline solids which can readily be separated from the unchanged reactants, if any, by conventional means such as fractional distillation or crystallization from appropriate solvents. When, as is usually the case, a mixture of compounds of types I and II is formed (which can be ascertained through infrared or nuclear magnetic resonance analysis of the mixture), it is often difficult to separate the two isomers by the usual physical means, such as fractional distillation or fractional crystallization. However, this is possible in certain cases, depending chiefly on the nature of the substituents present on the polycyclic compounds. Other methods of separation can be used in many cases, such as gas chromatography methods, or chemical methods whereby the unsaturated component is converted to a different product, for example, by oxidation of hydrogenation. In general, however, separation of the isomers is unnecessary since the mixture can be used as such in most applications.

The invention is illustrated in greater detail by the following examples.

*Example I*

A mixture of 10 g. of bicycloheptadiene and 10 g. of maleic anhydride was heated in a sealed glass vessel at 150° C. for 8 hours. The reaction product was chiefly a brittle polymeric solid, which was extracted with ether to yield 3.5 g. of a white crystalline material, M.P. 80–104° C. After two recrystallizations from chloroform-cyclohexane, this product melted at 114–119° C. It had the composition of a 1:1 molar adduct and did not decolorize aqueous potassium permanganate, indicating the absence of alicyclic or aliphatic unsaturation. This fact, coupled with its infrared absorption spectrum, indicated that the reaction product was tetracyclo(3.2.1.$1^{3,8}.0^{2,4}$)nonane-6,7-dicarboxylic anhydride,

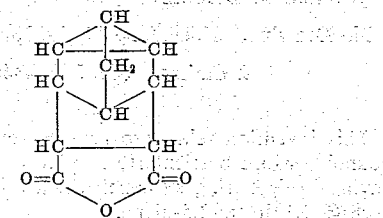

*Analysis.*—Calc'd for $C_{11}H_{10}O_3$: C, 69.5; H, 5.3; N. Eq., 95. Found: C, 69.0; H, 5.3; N. Eq., 95.

This experiment was essentially repeated by heating in a sealed glass tube for 10 hours at 150° C. a mixture of 20 g. of bicycloheptadiene and 20 g. of maleic anhydride to which had been added 0.5 g. of phenothiazine as polymerization inhibitor. The reaction product was all soluble in ether. Two recrystallizations from chloroform-cyclohexane gave essentially pure tetracyclo(3.2.1.$1^{3,8}.0^{2,4}$)-nonane-6,7-dicarboxylic anhydride, M.P. 115–119° C.

*Example II*

A mixture of 20 g. of bicycloheptadiene, 12 g. of acrylonitrile and 0.5 g. of phenothiazine was heated in a sealed glass tube at 200° C. for 8 hours. Distillation of the reaction product gave, after removal of the unchanged reactants, 13.6 g. of a liquid boiling at 73° C. at 3 mm., $n_D^{25}$ 1.5060, having the composition of a 1:1 molar adduct.

*Analysis.*—Cac'd for $C_{10}H_{11}N$: N, 9.7. Found: N, 9.6.

This material decolorized potassium permanganate in acetone, indicating the presence of unsaturation. Its infrared absorption spectrum showed that it was a mixture of 3-cyanotricyclo(4.2.1.$0^{2,5}$)non-7-ene,

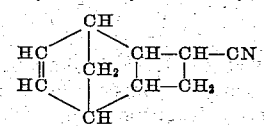

and 6-cyanotetracyclo(3.2.1.$1^{3,8}.0^{2,4}$)nonane,

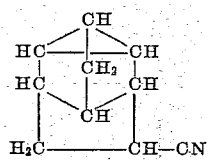

in which the latter predominated.

When this experiment was repeated except that the heating period was 12 hours at 200° C., there was obtained a 75% yield of the same 1:1 molar adduct.

*Example III*

A mixture of 37 g. of bicycloheptadiene, 35 g. of methyl acrylate and 1 g. of phenothiazine was heated at 200° C. for 12 hours in a sealed glass vessel. The liquid reaction product was distilled rapidly from a rather large amount of polymeric material which had formed, and then redistilled to give 19 g. of a 1:1 molar adduct boiling at 73° C. at 1 mm., $n_D^{26}$ 1.4915.

Analysis. — Calc'd for $C_{11}H_{14}O_2$: C, 74.2; H, 7.9. Found: C, 75.0; H, 8.2.

This product decolorized potassium permanganate. Its infrared absorption spectrum showed that it was a mixture of 3-methoxycarbonyltricyclo(4.2.1.0$^{2,5}$)non-7-ene,

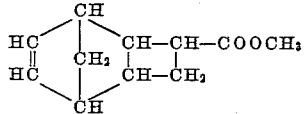

and 6-methoxycarbonyltetracyclo(3.2.1.1$^{3,8}$.0$^{2,4}$)nonane,

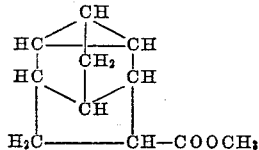

Example IV

A mixture of 34.4 g. of bicycloheptadiene, 25 g. of methacrylonitrile and 1 g. of phenothiazine was heated in a sealed glass tube at 200° C. for 12 hours. There was obtained 28.2 g. of reaction product boiling at 51–110° C. at 1 mm., which was refractionated. The fraction boiling at 78–96° C. at 0.8 mm. was shown by infrared and nuclear magnetic resonance spectral analysis to be a mixture of 3-methyl-3-cyanotricyclo(4.2.1.0$^{2,5}$)non-7-ene,

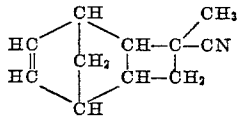

and 6-methyl-6-cyanotetracyclo(3.2.1.1$^{3,8}$.0$^{2,4}$)nonane,

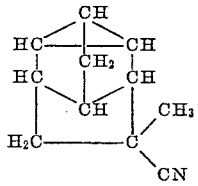

Example V

A mixture of 34.4 g. of bicycloheptadiene, 31.3 g. of methyl methacrylate and 1 g. of phenothiazine was heated in a sealed glass tube at 200° C. for 12 hours. Distillation of the reaction product gave 18.5 g. of a fraction boiling at 50–57° C. at 1 mm., which was shown by infrared and nuclear magnetic resonance analysis to be a mixture of 3-methyl-3-methoxycarbonyltricyclo(4.2.1.0$^{2,5}$)non-7-ene and 6-methyl-6-methoxycarbonyltetracyclo(3.2.1.1$^{3,8}$.0$^{2,4}$) nonane. This fraction took up hydrogen in an amount corresponding to the presence of about 60% of unsaturated adduct.

Example VI

A solution of 2 g. of bicycloheptadiene and 2.5 g. of tetracyanoethylene in 20 ml. of tetrahydrofuran was heated at reflux temperature (about 70° C.) for 3 hours. Evaporation of the liquids at reduced pressure gave 4 g. of a 1:1 molar adduct as a crystalline solid melting at 196° C. after recrystallization from benzene.

Analysis.—Calc'd for $C_{13}H_8O_4$: C, 70.90; H, 3.67; N, 25.44; M.W., 220. Found: C, 68.78; H, 3.84; N, 25.45; M.W., 235.

This material did not decolorize bromine in chloroform, indicating the substantial absence of olefinic unsaturation. Its infrared spectrum showed that its structure was that of 6,6,7,7-tetracyanotetracyclo(3.2.1.1$^{3,8}$.0$^{2,4}$)nonane,

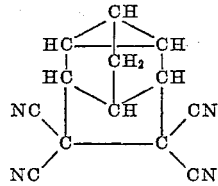

Example VII

A solution of 18.6 g. of maleic anhydride, 9.2 g. of bicycloheptadiene and 2.0 g. of bis(triphenyl phosphite) nickel dicarbonyl in 100 ml. of toluene was heated under reflux for about 48 hours. Removal of the toluene and unreacted maleic anhydride gave 16.7 g. of residue which partially crystallized. Distillation of this product gave 5.1 g. of tetracyclo(3.2.1.1$^{3,8}$.0$^{2,4}$)nonane-6,7-dicarboxylic anhydride which, after sublimation at 115° C. under 0.3 mm. pressure, melted at 122–125° C. The infrared spectrum of this product was identical with that of the product of Example I.

Example VIII

A solution of 100 g. of ethyl acrylate, 46 g. of bicycloheptadiene, 0.5 g. of hydroquinone and 1 g. of bis(triphenyl phosphite)nickel dicarbonyl in 200 ml. of toluene was heated at reflux for about 24 hours. Distillation of the reaction mixture gave 73.8 g. of 6-ethoxycarbonyltetracyclo(3.2.1.1$^{3,8}$.0$^{2,4}$)nonane, B.P. 110–112° C. at 12 mm. pressure, $n_D^{25}$ 1.4848–1.4852.

Analysis.—Calc'd for $C_{12}H_{16}O_2$: C, 75.00; H, 8.35; Sap. Eq. 192.2. Found: C, 75.71; H, 8.39; Sap. Eq. 197.

In addition to the reactants and reaction products shown in the foregoing examples, the invention is further specifically illustrated by the following polycyclic compounds, which are obtained by reaction of bicycloheptadiene with the α,β-unsaturate mentioned in each case:

From crotonic acid, 3-carboxy-4-methyltricyclo(4.2.1.0$^{2,5}$)non-7-ene and 6-carboxy-7-phenyltetracyclo(3.2.1.1$^{3,8}$.0$^{2,4}$)nonane.

From cinnamic acid, 3-carboxy-4-phenyltricyclo(4.2.1.0$^{2,5}$)non-7-ene and 6-carboxy-7-phenyltetracyclo(3.2.1.1$^{3,8}$.0$^{2,4}$)nonane.

From methyl β-ethylacrylate, 3-methoxycarbonyl-4-ethyltricyclo(4.2.1.0$^{2,5}$)non - 7 - ene and 6 - methoxycarbonyl-7-ethyltetracyclo(3.2.1.1$^{3,8}$.0$^{2,4}$)nonane.

From ethyl α - phenylacrylate, 3 - ethoxycarbonyl - 3 - phenyltricyclo(4.2.1.0$^{2,5}$)non-7-ene and 6-ethoxycarbonyl-6-phenyltetracyclo(3.2.1.1$^{3,8}$.0$^{2,4}$)nonane.

From ethyl β,β-dimethylacrylate, 3-ethoxycarbonyl-4,4-dimethyltricyclo(4.2.1.0$^{2,5}$) non-7-ene and 6-ethoxycarbonyl-7,7-dimethyltetracyclo(3.2.1.1$^{3,8}$.0$^{2,4}$)nonane.

From diethyl methylenemalonate, 3,3 - diethoxycarbonyltricyclo(4.2.1.0$^{2,5}$)non-7-ene and 6,6-diethoxycarbonyltetracyclo(3.2.1.1$^{3,8}$.0$^{2,4}$)nonane.

From crotononitrile, 3-cyano-4-methyltricyclo-(4.2.1.0$^{2,5}$)non-7-ene and 6-cyano-7-methyltetracyclo-(3.2.1.1$^{3,8}$.0$^{2,4}$)nonane.

From β-cyclohexylacrylonitrile, 3-cyano-4-cyclohexyltricyclo(4.2.1.0$^{2,5}$)non-7-ene and 6-cyano-7-cyclohexyltetracyclo(3.2.1.1$^{3,8}$.0$^{2,4}$)nonane.

From citraconic anhydride, 6-methyltetracyclo-(3.2.1.1$^{3,8}$.0$^{2,4}$)nonane-6,7-dicarboxylic anhydride.

From dimethylmaleic anhydride, 6,7-dimethyltetracyclo(3.2.1.1$^{3,8}$.0$^{2,4}$)nonane-6,7-dicarboxylic anhydride.

The polycyclic products of this invention are liquids or crystalline solids soluble in the common organic solvents and possessing good thermal resistance and stability toward chemical and physical agents such as oxygen or light. They can be heated to reflux temperature even in the presence of air without appreciable decomposition.

These products are susceptible of a number of practical applications, among which the following may be mentioned. Many of the polycyclic compounds having ester groups have pleasant odors and are suitable ingredients for perfume compositions or deodorant compositions in liquid or sprayable form. The most stable and higher boiling polycyclic compounds are useful as heat exchange media. The neutral products, e.g., those having ester groups, are useful as additives for lubricating or fuel oils and gasoline. The more volatile compounds find uses as degreasing solvents. Further, the carboxy groups of these polycyclic materials can be converted to metal salts, e.g., aluminum, nickel, copper, lead salts, etc., for use in textile treatments, as soap ingredients, pigment ingredients, and the like.

The products are also useful as a rich source of other chemicals containing a complex ring structure in view of their reactive carboxy or carboxy-precursor groups and, for one of the isomeric forms, of the intracyclic double bonds. The products having anhydride groups or two carboxy-precursor groups are bifunctional and can react with complementary bifunctional agents, e.g., glycols or diamines, to lead to new condensation polymers.

Thus, an alkali-soluble film-forming resin, useful, for example, as a removable binder for light-sensitive compositions, was prepared by reacting 2 g. of the tetracyclo-(3.2.1.1$^{3,8}$.0$^{2,4}$)nonane-6,7-dicarboxylic anhydride of Example I with 1.5 g. of cellulose acetate (containing 43.7% combined acetic acid) in refluxing dioxane for 21 hours. The resulting mixed cellulose ester was isolated by pouring the solution in water. It was soluble in 6N aqueous ammonium hydroxide, in contrast with the untreated cellulose acetate.

Another film-forming polyester was prepared by heating tetracyclo(3.2.1.1$^{3,8}$.0$^{2,4}$)nonane-6,7-dicarboxylic acid with a large excess of glycerol at about 200° C. for 5 minutes. The resulting viscous liquid was cast onto an aluminum plate and baked at 200° C. for 100 minutes. There was obtained a hard, highly glossy film having good adhesion to the support.

We claim:

1. A polycyclic organic compound selected from the group consisting of tricyclo (4.2.1.0$^{2,5}$)non-7-enes having the formula

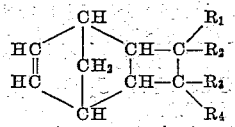

and tetracyclo (3.2.1.1$^{3,8}$.0$^{2,4}$)nonanes having the formula

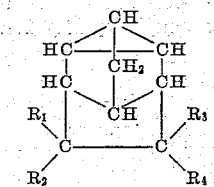

wherein at least one of the R's is selected from the group consisting of —COOH; —COOR, where R is a hydrocarbon radical free of non-aromatic unsaturation of 1 to 6 carbon atoms; and —CN; and the remaining R's are selected from the group consisting of hydrogen atoms and hydrocarbon radicals of from 1 to 6 carbon atoms and free of non-aromatic unsaturation, and the anhydride group —CO—O—CO—, formed by two R's attached to separate carbon atoms.

2. The process comprising reacting with bicyclo(2.2.1)hepta-2,5-diene, a compound of the formula

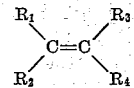

wherein at least one of the R's is a member of the group consisting of —COOH; —COOR, where R is a hydrocarbon radical free of non-aromatic unsaturation of 1 to 6 carbon atoms; and —CN; the other R's being selected from the group consisting of hydrogen and radicals of 1 to 6 carbon atoms and free of non-aromatic unsaturation, and the anhydride group —CO—O—CO— formed by two R's attached to separate carbon atoms.

References Cited in the file of this patent

Alder et al.: Berichte, vol. 86, pp. 1528–39.

UNITED STATES PATENT OFFICE

CERTIFICATE OF CORRECTION

Patent No. 2,940,984            June 14, 1960

Douglas E. Applequist et al.

It is hereby certified that error appears in the printed specification of the above numbered patent requiring correction and that the said Letters Patent should read as corrected below.

Column 3, line 31, for "bi(triphenyl" read --bis(triphenyl--; column 6, line 43, for "6-carboxy-7-phenyltetracyclo(3.2.-" read -- 6-carboxy-7-methyltetracyclo(3.2.- --.

Signed and sealed this 15th day of November 1960.

(SEAL)
Attest:

KARL H. AXLINE
Attesting Officer

ROBERT C. WATSON
Commissioner of Patents